US012361423B2

(12) United States Patent
Hayes, Jr.

(10) Patent No.: US 12,361,423 B2
(45) Date of Patent: Jul. 15, 2025

(54) REQUEST PROCESSING VIA RICH MESSAGING SYSTEMS

(71) Applicant: LIVEPERSON, INC., New York, NY (US)

(72) Inventor: Marc F. Hayes, Jr., Atlanta, GA (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/207,771

(22) Filed: Jun. 9, 2023

(65) Prior Publication Data
US 2024/0112190 A1 Apr. 4, 2024

Related U.S. Application Data

(63) Continuation of application No. 17/338,980, filed on Jun. 4, 2021, now Pat. No. 11,823,195.

(60) Provisional application No. 63/035,418, filed on Jun. 5, 2020.

(51) Int. Cl.
*G06Q 20/40* (2012.01)
*G06Q 20/04* (2012.01)
*G06Q 20/38* (2012.01)

(52) U.S. Cl.
CPC ..... *G06Q 20/40145* (2013.01); *G06Q 20/047* (2020.05); *G06Q 20/3829* (2013.01)

(58) Field of Classification Search
CPC ........... G06Q 20/40145; G06Q 20/047; G06Q 20/3829
See application file for complete search history.

(56) References Cited

U.S. PATENT DOCUMENTS

| 10,423,948 | B1 * | 9/2019 | Wilson | G06Q 20/386 |
| 10,810,574 | B1 * | 10/2020 | Wilson | G06Q 20/389 |
| 10,810,592 | B1 * | 10/2020 | Omojola | G06Q 30/0637 |
| 2007/0011104 | A1 * | 1/2007 | Leger | G06Q 20/085 705/77 |
| 2007/0208816 | A1 * | 9/2007 | Baldwin | H04L 12/1831 709/206 |
| 2008/0147514 | A1 * | 6/2008 | Shuster | G06Q 30/0633 705/26.8 |
| 2012/0160912 | A1 * | 6/2012 | Laracey | H04W 12/069 235/379 |

(Continued)

OTHER PUBLICATIONS

Nor Azlina Bt Abd Rahman, SMS Banking Transaction as an Alternative for Information, Transfer and Payment at Merchant Shops in Malaysia, Oct. 10, 2013, IEEE, pp. 1-6 (Year: 2013).*

*Primary Examiner* — Nilesh B Khatri
(74) *Attorney, Agent, or Firm* — POLSINELLI LLP

(57) ABSTRACT

Disclosed embodiments provide a framework to enable rich messaging via offline channels to obtain payments for completion of business transactions. In response to a request to obtain information associated with a customer to support a transaction performed via a communications session, a messaging platform transmits a request to a computing device associated with the customer to obtain authorization for the information. In response to obtaining the authorization for the information from the computing device associated with the customer, the messaging platform uses the authorization at a processing service to obtain the information subject to the authorization. The information is provided to fulfill the initial request.

21 Claims, 6 Drawing Sheets

(56) References Cited

U.S. PATENT DOCUMENTS

| | | | | |
|---|---|---|---|---|
| 2012/0191614 | A1* | 7/2012 | Babitch | G06Q 40/02 |
| | | | | 705/44 |
| 2017/0004496 | A1* | 1/2017 | Pujari | G06Q 20/3829 |
| 2017/0186015 | A1* | 6/2017 | Jin | G06Q 20/401 |
| 2017/0364912 | A1* | 12/2017 | Ross | G06Q 20/105 |
| 2019/0147430 | A1* | 5/2019 | Chen | G06F 18/2155 |
| | | | | 705/40 |
| 2019/0266589 | A1* | 8/2019 | Tiwaree | G06Q 20/322 |
| 2021/0014182 | A1* | 1/2021 | Stafford | H04W 8/26 |
| 2022/0150692 | A1* | 5/2022 | O'Kane | G06Q 20/322 |

* cited by examiner

REQUEST PROCESSING VIA RICH MESSAGING SYSTEMS

CROSS-REFERENCE TO RELATED APPLICATIONS

The present patent application is a continuation of U.S. patent application Ser. No. 17/338,980 filed Jun. 4, 2021, which claims the priority benefit of U.S. provisional patent application No. 63/035,418 filed Jun. 5, 2020, the disclosures of which are incorporated by reference herein.

FIELD

The present disclosure relates generally to systems and methods for facilitating digital messaging via offline channels to enable rich messaging among entities. More specifically, techniques are provided to deploy a framework to enable rich messaging via offline channels to obtain payments for completion of business transactions.

SUMMARY

Disclosed embodiments provide a framework for enabling rich messaging via offline channels to obtain payments for completion of transactions between customers and brands. According to some embodiments, a computer-implemented method is provided. The computer-implemented method comprises receiving a payment request associated with a customer. The payment request is further associated with an end agent that requires a payment associated with the customer. Further, information used to access the payment is not directly accessible by the end agent. The computer-implemented method further comprises transmitting an authorization request to obtain authorization for the payment. The authorization request is transmitted such that, when the authorization request is received at a computing device associated with the customer, the authorization request is used to prompt the customer for authorization data and the information used to access the payment. The computer-implemented method further comprises receiving the authorization data and the information. The computer-implemented method further comprises using the authorization data and the information to obtain the payment. The authorization data and the information are used such that, when the authorization data and the information are received at a processing service, the processing service uses the authorization data and the information to retrieve the payment. The computer-implemented method further comprises providing a transaction code. The transaction code is provided such that, when the transaction code is received by the end agent, the end agent uses the transaction code to obtain the payment without directly accessing the information.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
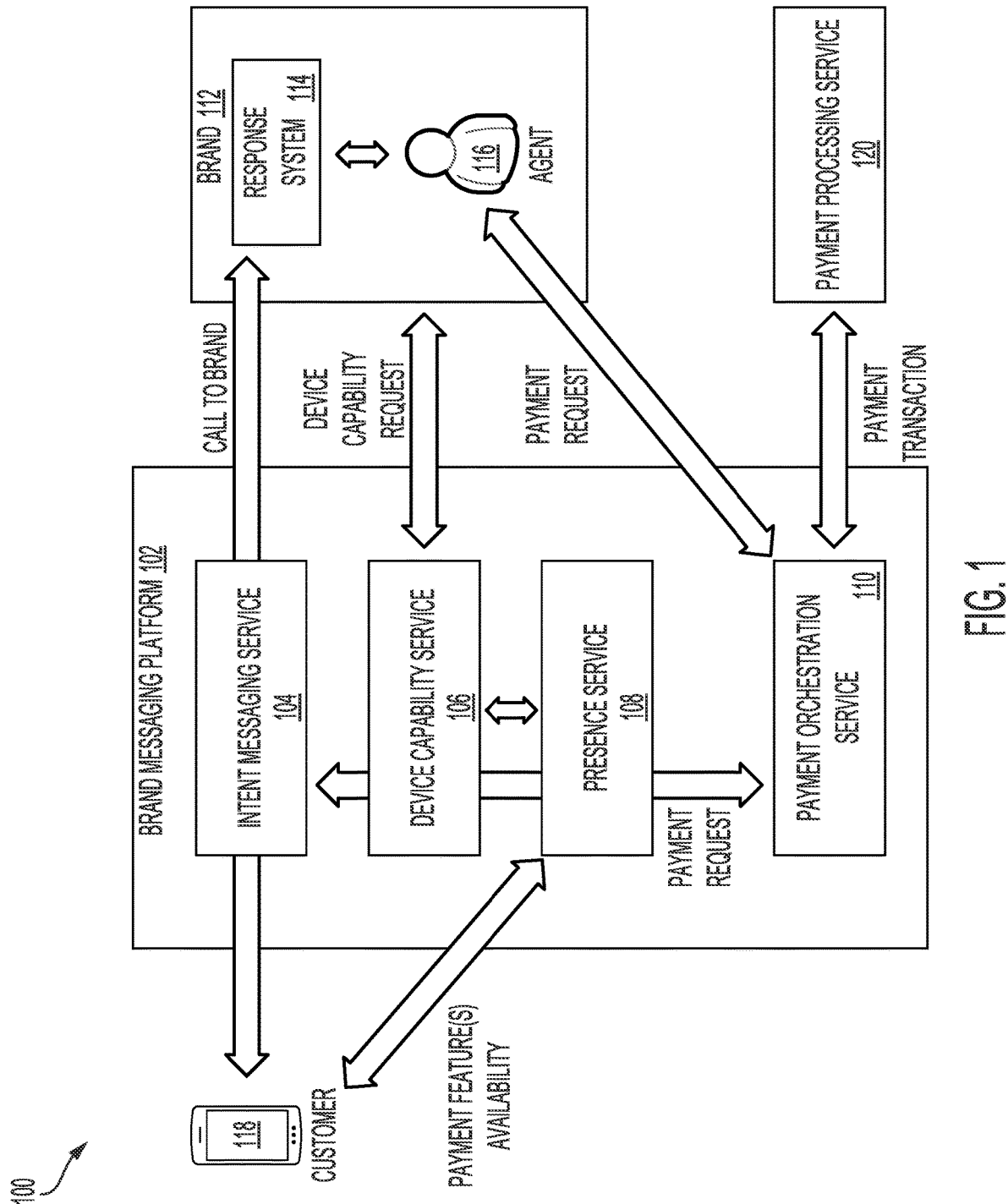
FIG. 1 shows an illustrative example of an environment in which a brand messaging platform, in conjunction with a payment processing service, processes a payment transaction between a customer computing device and a brand in accordance with at least one embodiment.

FIG. 1 shows an illustrative example of an environment 100 in which a brand messaging platform 102, in conjunction with a payment processing service 120, processes a payment transaction between a customer computing device 118 and a brand 112 in accordance with at least one embodiment. In the environment 100, a customer of a brand messaging platform 102 may be engaged in a communications session with a response system 114 of a brand 112 via an intent messaging service 104 provided by the brand messaging platform 102. The intent messaging service 104 may provide a platform for customers and brands to connect in order to provide recommendations and advice with regard to intents submitted by these customers. An intent may (for example) be a topic, sentiment, complexity, and/or level of urgency. A topic can include, but is not limited to, a subject, a product, a service, a technical issue, a use question, a complaint, a refund request or a purchase request, etc.

The intent messaging service 104 may utilize an intent submitted by the customer computing device 118 by a customer to identify a brand, such as brand 112, that is likely to provide a relevant response to the intent. Based on the response submitted by the brand 112, the customer may determine whether to engage the brand 112 further with regard to the intent. If so, the intent messaging service 104 may establish a communications session between the customer computing device 118 and a response system 114 of the brand 112. Using an intent messaging application provided by the brand messaging platform 102 and implemented on the customer computing device 118, a customer may engage in the communications session with the response system 114 of the brand 112. Through this communications session, the customer and the response system 114 may exchange messages or other information with regard to the intent previously submitted by the customer to the intent messaging service 104.

The communications session established by the intent messaging service 104 between the customer computing device 118 and the response system 114 may be implemented subject to a Rich Communication Services (RCS) protocol or other multimedia protocol through which the customer and the response system 114 may exchange rich messages or other in-call multimedia. In some instances, the communications session may be established as a voice call or video call, through which the customer may interact with the response system 114 of the brand 112. Alternatively, the communications session may be established as an instant messaging or other form of chat messaging, through which the customer and response system 114 may exchange text-based messages over the communications session.

During the communications session between the customer computing device 118 and the response system 114 of the brand 112, the response system 114 may determine that a payment is required from the customer in order to provide the customer with goods and/or services of the brand 112. For instance, the response system 114 may determine that in order for the brand 112 to address the intent submitted by the customer, the customer may be required to purchase one or more items or utilize one or more services provided by the brand 112. Through the communications session, the response system 114 may promote these goods and/or services and prompt the customer to determine whether the customer would like to purchase said goods and/or services. If the customer indicates that it wants to purchase any of these goods and/or services, the response system 114 may determine whether the customer is able to provide payment for said goods and/or services via rich messaging and/or the intent messaging application implemented on the customer computing device 118.

In an embodiment, if a payment is required from the customer, the response system 114 transmits a request to a device capability service 106 of the brand messaging platform 102 to identify the capabilities of the customer computing device 118 to submit payments using rich messaging via the RCS protocol or through the intent messaging application implemented on the customer computing device 118. The device capability service 106 may comprise one or more computer systems of the brand messaging platform 102 or may be implemented as an application or process executing on a computer system of the brand messaging platform 102. The request from the response system 114 may include identifying information of the customer. To obtain this identifying information of the customer, the response system 114 may solicit information from the customer that may be used by the brand messaging platform 102 to identify the customer and query an account of the customer. For instance, the response system 114, via the communications session, may ask the customer for its username or other customer identifier associated with the brand messaging platform 102. Alternatively, if the communications session between the customer and the response system 114 is brokered via an intent messaging service 104, the device capability service 106 may obtain the customer's identifier from the intent messaging service 104.

In some instances, if the customer has an existing relationship with the brand 112, the intent messaging service 104 may pass account information associated with the customer for the brand 112 to the response system 114 of the brand 112. During the communications session between the customer computing device 118 and the response system 114 of the brand 112, the response system 114 may prompt the customer to confirm its identity. In response to this prompt, the intent messaging service 104 may prompt the customer to provide authentication information that may be used by the intent messaging service 104 to authenticate the customer. For instance, the intent messaging service 104 may prompt the customer to provide biometric information that may be used to verify and authenticate the customer. If the customer is successfully authenticated by the intent messaging service 104, the intent messaging service 104 may transmit a response to the response system 114 indicating that the customer has been authenticated. This may cause the response system 114 to continue the communications session with the customer in an authenticated state.

In some instances, if the intent messaging service 104 determines that the customer does not have a pre-existing relationship with the brand 112 (e.g., no account information specific to the brand 112 is available for the customer), the response system 114 may request release of customer information from the brand messaging platform 102. In response to the request, the intent messaging service 104 may notify the customer of the brand's request. This may allow the customer to determine whether to authorize the release of customer information to the response system 114 associated with the brand 112. Using the released customer information, the brand 112 may create a new account for the customer and may provide account information associated with this account to the brand messaging platform 102. The brand messaging platform 102 may maintain this account information, which may be used for authentication of the customer for the benefit of the brand 112 in future communications.

In response to the request from the response system 114 of the brand 112, the device capability service 106 may determine whether the customer computing device 118 is known to support the submission of payments via rich messaging and/or via an intent messaging application. For instance, the device capability service 106 may utilize the customer identifier provided by the response system 114 to retrieve configuration information of the customer computing device 118. For instance, as part of a registration process with the brand messaging platform 102, a customer may be prompted to provide specifications of the computing device that is to be used to access the brand messaging platform 102 and any of the services provided by the brand messaging platform 102. These specifications may include the storage capacity of the computing device, the amount of memory of the computing device, the processor(s) implemented on the computing device, the mobile network operator utilized by the computing device, and the like. In some instances, if the customer computing device 118 implements an intent messaging application as described above, the intent messaging application may identify the capabilities of the computing device 118 and transmit information corresponding to these capabilities to the brand messaging platform 102.

If the device capability service 106 determines that the customer computing device 118 is known to be capable of transmitting rich messages, through which payments may be submitted, the device capability service 106 may transmit a request to a presence service 108 of the brand messaging platform 102 to determine whether the customer computing device 118 is presently capable of transmitting rich messages to the brand messaging platform 102 for the submission of payments or other information as may be requested by the brand 112. The presence service 108 may comprise one or more computer systems of the brand messaging platform 102 or may be implemented as an application or process executing on a computer system of the brand messaging platform 102. In response to the request from the device capability service 106, the presence service 108 may determine whether the intent messaging application implemented on the customer computing device 118 is available to provide responses to queries from the brand messaging platform 102. For instance, the presence service 108 may ping the intent messaging application implemented on the customer computing device 118 to determine whether the intent messaging application is receiving and transmitting data packets.

If the intent messaging application is available, the presence service 108 may transmit a request to the intent messaging application to identify the present capabilities of the customer computing device 118 to support rich messaging for the submission of payments. In response to the request from the presence service 108, the intent messaging application may evaluate the customer computing device 118 to determine the present capabilities of the customer computing device 118 and determine whether the device can support rich messaging for the submission of payments or other information that may be requested by a brand 112. The intent messaging application may transmit a response to the presence service 108 indicating the present capabilities of the customer computing device 118 to support rich messaging for the submission of payments or other information. It should be noted that while the intent messaging application is utilized extensively throughout the present disclosure for the purpose of illustration, the determination of the present capabilities of the customer computing device 118 may be performed subject to the RCS protocol. For instance, the presence service 108 may transmit the request to any application of the customer computing device 118 that supports the RCS protocol and can thus determine the present capabilities of the customer computing device 118.

If the presence service 108 determines that the customer computing device 118 is currently capable of supporting the transmission of payments or other information via rich messaging and/or via the intent messaging application, the presence service 108 may alert the brand 112, via the device capability service 106, to indicate that the customer computing device 118 is capable of supporting submission of payments or other information using rich messaging and/or via the intent messaging application. In response to the alert, the brand 112 may prompt an agent 116 associated with the brand 112 to submit a request to a payment orchestration service 110 of the brand messaging platform 102 to obtain a payment or other information from the customer for goods and/or services that are to be provided to the customer by the brand 112. The payment orchestration service 110 may comprise one or more computer systems of the brand messaging platform 102 or may be implemented as an application or process executing on a computer system of the brand messaging platform 102.

The agent 116 associated with the brand 112 may submit a request to the payment orchestration service 110 to obtain a payment or other information from the customer. The request may specify the amount of the payment that is to be obtained from the customer, as well as a description of the goods and/or services for which payment is required from the customer. Additionally, the request may include an identifier of the customer (e.g., identifier assigned to the customer by the brand messaging platform 102, etc.) or other identifying information of the customer (e.g., contact information of the customer, a network address of the customer, etc.). The request from the agent 116 may also include authentication information of the brand 112. This authentication information may be used by the payment orchestration service 110 to authenticate the agent 116 and determine whether the agent 116 is authorized to request and obtain payments from the customer on behalf of the brand 112.

If the payment orchestration system successfully authenticates the agent 116 and determines that the agent 116 is authorized to submit the request for payment or other information from the customer, the payment orchestration service 110 may generate a virtual cart with a payment processing service 120 designated by the brand 112 for processing of payments from the customer. The virtual cart may specify the goods and/or services that are to be provided by the brand 112 to the customer. Further, the virtual cart may specify the payment amount being requested by the agent 116 as part of the transaction between the customer and the brand 112. The payment orchestration service 110 may assign the virtual cart a unique identifier that is associated with the request submitted by the agent 116. The unique identifier may also be associated with an identifier of the brand 112 and an identifier of the customer. In an embodiment, the virtual cart also includes a timestamp corresponding to a time at which the request was submitted by the agent 116. This timestamp may be used to determine an expiration of the virtual cart if a payment authorization is not received from the customer within an expiration period extending from the time indicated in the timestamp. The payment orchestration service 110 may track the expiration period for the virtual cart to determine whether the virtual cart is expired prior to obtaining a payment authorization from the customer.

The payment orchestration service 110 may transmit a request to the intent messaging application implemented on the customer computing device 118 to obtain a payment authorization that can be used to obtain a payment for the brand 112. The request may include the virtual cart generated by the payment orchestration service 110. Further, the request may specify the goods and/or services that the customer is agreeing to provide payment for as part of the transaction between the customer and the agent 116 associated with the brand 112. The request may also specify, for each of the goods and/or services to be provided by the brand 112, the associated cost to the customer. These costs, in addition to any other associated fees may total the payment requested of the customer. The request may be transmitted to the customer computing device 118 as a rich message generated according to the RCS protocol. Alternatively, the request may be transmitted directly to the intent messaging application implemented on the customer computing device 118. It should be noted that requests to obtain a payment authorization that can be used to obtain a payment for the brand 112 can be submitted to any application (in addition to the intent messaging application) that have the capability to support payments or proactive messaging.

The intent messaging application implemented on the customer computing device 118 may present the payment request to the customer and prompt the customer for authorization to release a payment to the agent 116. For instance, the intent messaging application may update a user interface of the customer computing device 118 to present the customer with the request for payment. The intent messaging application may also prompt the customer to provide its payment authorization via one or more authorization methods approved by the payment orchestration service 110 and/or the payment processing service 120. The customer, via the user interface, may submit a PIN, password, one or more forms of biometric information (e.g., fingerprints, retinal scans, facial scans, audial recording, video recording, etc.), or any other identifying information of the customer that may serve as an indication of authorization for the payment. In addition to prompting the customer for its authorization information, the intent messaging application may prompt the customer to select a method of payment. For instance, via the intent messaging application, the customer may provide its credit card information, banking information, digital wallet information, and the like.

The intent messaging application may transmit, using a rich message via the RCS protocol or through any other available communications protocol, an encrypted data packet to the payment orchestration service 110. The encrypted data packed may include the payment authorization information provided by the customer, as well as the payment information corresponding to the method of payment selected by the customer. In response to obtaining the encrypted data packet from the intent messaging application, the payment orchestration service 110 may evaluate the data packet determine whether the customer has provided its authorization for payment to be made to the agent 116 associated with the brand 112. For instance, in response to obtaining the encrypted data packet from the intent messaging application, the payment orchestration service 110 may use a cryptographic key or a shared secret to verify that the encrypted data packet is authentic and, if so, decrypt the encrypted data packet to obtain the customer's payment information and authorization information for the payment.

The payment orchestration service 110, in response to obtaining the customer's payment authorization information, may evaluate this information to determine whether it is valid. For instance, the payment orchestration service 110 may evaluate the obtained authorization information from the intent messaging application against the known valid authorization information stored in the customer's account to determine whether the authorization information provided by the customer is valid. If the payment orchestration service 110 determines that the authorization information is valid, the payment orchestration service 110 may transmit the payment information provided by the customer, as well as the unique identifier corresponding to the virtual cart, to the payment processing service 120.

The payment processing service 120 may initiate a transaction subject to the method selected by the customer and the payment information submitted by the customer. In some instances, the payment orchestration service 110 may provide payment authorization information of the customer to the payment processing service 120, which may provide this payment authorization information to a payment provider. The payment provider may evaluate the authorization information to ensure that it is valid. If so, the payment provider may release the requisite payment to the payment processing service 120. If the payment is obtained by the payment processing service 120 from a payment provider, the payment processing service 120 may provide, to the payment orchestration service 110, a transaction code corresponding to this payment. The payment orchestration service 110 may generate a digital receipt that specifies the goods and/or services that the customer has submitted payment for, the payment amount, a transaction code corresponding to the payment transaction, and the like. The payment orchestration service 110 may transmit the digital receipt to the intent messaging application to cause the intent messaging application to present the digital receipt to the customer.

In addition to providing a digital receipt to the intent messaging application, the payment orchestration service 110 may transmit a transaction code from the payment processing service 120 to the agent 116. The agent 116 may use the transaction code to verify that the customer has provided its payment for the goods and/or services offered by the brand 112 and to retrieve the payment from the payment processing service 120. The agent 116 may confirm with the customer, over the communications session, that the payment has been received. Further, the agent 116 may provide the goods and/or services indicated in the transaction to the customer.

It should be noted that while payment transactions are described extensively throughout the present disclosure for the purpose of illustration, other information may be provided to the agent 116 associated with the brand 112 in the course of a communications session between the customer and the agent 116 without any sensitive information of the customer being exposed to the agent 116 (e.g., credit card or other payment information, personally identifiable information (PII) of the customer, etc.). For example, the agent 116 associated with the brand 112 may submit a request to the brand messaging platform 102 to obtain recommendations that can be provided by the agent 116 to the customer 118 over the communications session. As another example, the agent 116 may submit a request to the brand messaging platform 102 to obtain support material, transaction confirmation information, account management confirmation information, and the like. In this request, the agent 116 may provide information regarding the nature of the communications session (e.g., topic, issues presented by the customer, timeframes provided by the customer, any products identified by the customer and/or the agent 116, etc.). The brand messaging platform 102 may provide the agent 116 with the requested information, as noted herein, without exposition information of other brands that may utilize the brand messaging platform 102.

In response to the request from the agent 116, the brand messaging platform 102 may utilize a machine learning model to process the incoming request from the agent 116, as well as information associated with the customer that is otherwise not accessible by the agent 116, to generate an output. This output may specify the recommendations and/or customer idiosyncrasies that may be used by the agent 116 in communicating with the customer over the communications session. The machine learning model may be trained using supervised learning techniques. For instance, a dataset of input requests and corresponding recommendations and/or idiosyncrasies of requestors can be selected for training of the machine learning model. In some examples, the input requests can be obtained from administrators of the brand messaging platform 102, customers of the brand messaging platform 102, or other sources associated with the brand messaging platform 102. In some implementations, known recommendations and/or customer idiosyncrasies used to train the machine learning model 208 may include characteristics of customer or expected recommendations provided by the entities that generated the sample requests. The machine learning model may be evaluated to determine, based on the input sample requests supplied to the machine learning model, whether the machine learning model is providing useful recommendations that can be provided to the requesting entities and/or idiosyncrasies of the requesting entities. Based on this evaluation, the machine learning model may be modified (e.g., one or more parameters or variables may be updated) to increase the likelihood of the machine learning model generating the desired results.

The brand messaging platform 102, in response to the request from the agent 116, utilizes the request and information associated with the customer maintained by the brand messaging platform 102 and inaccessible by the agent 116, as input to the machine learning model. The output of the machine learning model may include recommendations that the agent 116 may present to the customer over the communications session. These recommendations may correspond to goods and/or services provided by the brand 112, responses to customer issues and/or concerns that are likely to result in a positive response from the customer, and the like. Further, the output may include details regarding a customer's idiosyncrasies, such as a customer's stress level as a function of the customer's tone or use of language. These recommendations and/or idiosyncrasies may be utilized by the agent 116 to provide tailored responses to the customer over the communications session without the agent 116 being able to access any sensitive information of the customer that may be maintained by the brand messaging platform 102.

Figure 2:
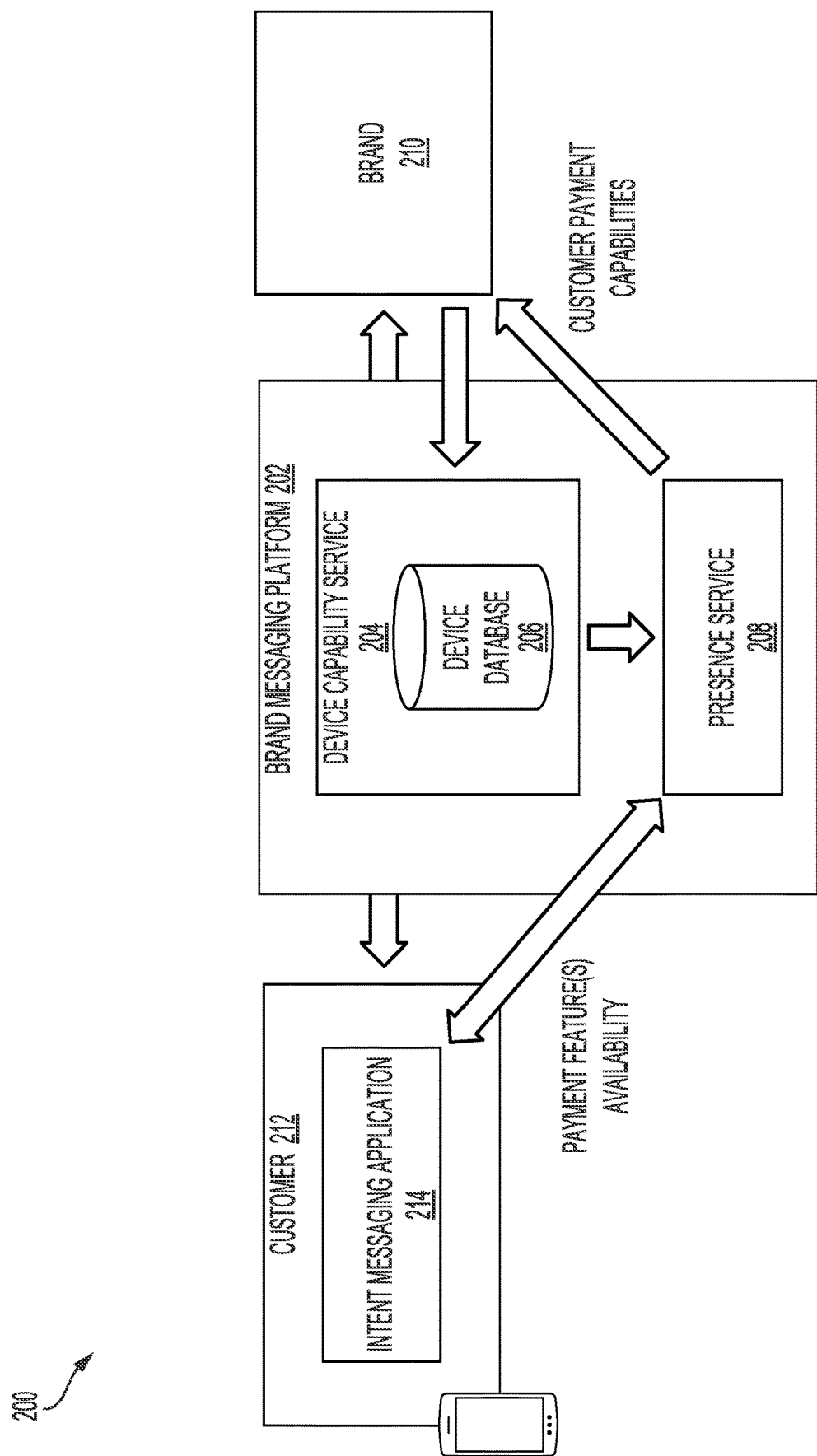
FIG. 2 shows an illustrative example of an environment in which a brand messaging platform identifies, in response to a request from a brand, capabilities of a customer computing device for rich messaging and payment authorization in accordance with at least one embodiment.

FIG. 2 shows an illustrative example of an environment 200 in which a brand messaging platform 202 identifies, in response to a request from a brand 210, capabilities of a customer computing device for rich messaging and payment authorization in accordance with at least one embodiment. In the environment 200, an integrated voice response (IVR) system of a brand 210, or an agent associated with the brand 210, transmits a request to a device capability service 204 of the brand messaging platform 202 to determine the capabilities of a customer's computing device to submit payments using rich messaging, such as through an RCS protocol, or via an intent messaging application 214 implemented on the customer's computing device. For instance, in the course of a communications session between a customer 212 and the brand 210, the brand 210 may determine that the customer 212 is required to provide a payment to the brand 210. This communications session may include a voice call, a video call, a text-based communications session (e.g., SMS messaging, RCS messaging, instant messaging, etc.), and the like.

The request from the brand 210 may include identifying information of the customer 212. For instance, the brand 210, during the communications session with the customer 212, may solicit information from the customer 212 that may be used by the brand messaging platform 202 to identify the customer 212 and query an account of the customer 212. For instance, the brand 210 may ask the customer 212 for its username or other customer identifier associated with the brand messaging platform 202. Alternatively, if the communications session between the customer 212 and the brand 210 is brokered via an intent messaging service implemented by the brand messaging platform 202, the device capability service 204 may obtain the customer's identifier from the intent messaging service.

In response to the request, the device capability service 204 may determine whether the customer's computing device is known to support the submission of payments via rich messaging and/or via an intent messaging application 214. For instance, the device capability service 204 may utilize the customer identifier provided by the brand 210 to retrieve configuration information of the customer's computing device from a device database 206 maintained by the device capability service 204. The device database 206 may include, for each customer, an entry corresponding to the computing device utilized by the customer 212 to engage with brands and other entities via the brand messaging platform 202. For instance, as part of a registration process with the brand messaging platform 202, the customer 212 may be prompted to provide specifications of the computing device utilized to access the brand messaging platform 202 and any of the services provided by the brand messaging platform. These specifications may include the storage capacity of the computing device, the amount of memory of the computing device, the processor(s) implemented on the computing device, the mobile network operator utilized by the computing device, and the like. If the computing device implements an intent messaging application 214 provided by the brand messaging platform 202, the intent messaging application 214 may identify the capabilities of the computing device and transmit information corresponding to these capabilities to the brand messaging platform 202. The device capability service 204 may update the entry corresponding to the customer's computing device in the device database 206 to indicate the known capabilities of the customer's computing device.

If the device capability service 204 determines that the customer's computing device is known to support rich messaging for submission of payments, or is otherwise known to support rich messaging, the device capability service 204 may transmit a request to a presence service 208 of the brand messaging platform 202 to determine whether the customer's computing device is currently capable of submitting a payment via rich messaging and/or via the intent messaging application 214. In response to this request, the presence service 208 implemented by the brand messaging platform 202 may determine whether the intent messaging application 214 implemented on the customer's computing device is available to provide responses to queries from the brand messaging platform 202. The presence service 208, for instance, may ping the intent messaging application 214 to determine its availability. If the intent messaging application 214 is available, the presence service 208 may transmit a request to the intent messaging application 214 to identify the present capabilities of the customer's computing device to support rich messaging for the submission of payments. The intent messaging application 214 may evaluate the customer's computing device to determine the present capabilities of the customer's computing device and determine, based on these present capabilities, if the customer's computing device can support rich messaging. The intent messaging application 214 may transmit a response to the request to the presence service 208 indicating the present capabilities of the customer's computing device and/or a determination as to whether the customer's computing device supports rich messaging for the submission of payments.

Based on the response from the intent messaging application 214, the presence service 208 may determine whether the customer's computing device is currently capable of supporting payments via rich messaging and/or via the intent messaging application 214. If the presence service 208 determines that the customer's computing device supports the submission of payments via rich messaging and/or through the intent messaging application 214, the presence service 208 may alert the brand 210 to indicate that the customer's computing device is capable of supporting submission of payments using rich messaging and/or via the intent messaging application 214. This alert may cause the brand 210 to prompt an agent associated with the brand 210 to submit a request to a payment orchestration service of the brand messaging platform 202 to obtain a payment from the customer 212 for goods and/or services that are to be provided to the customer by the brand.

Figure 3:
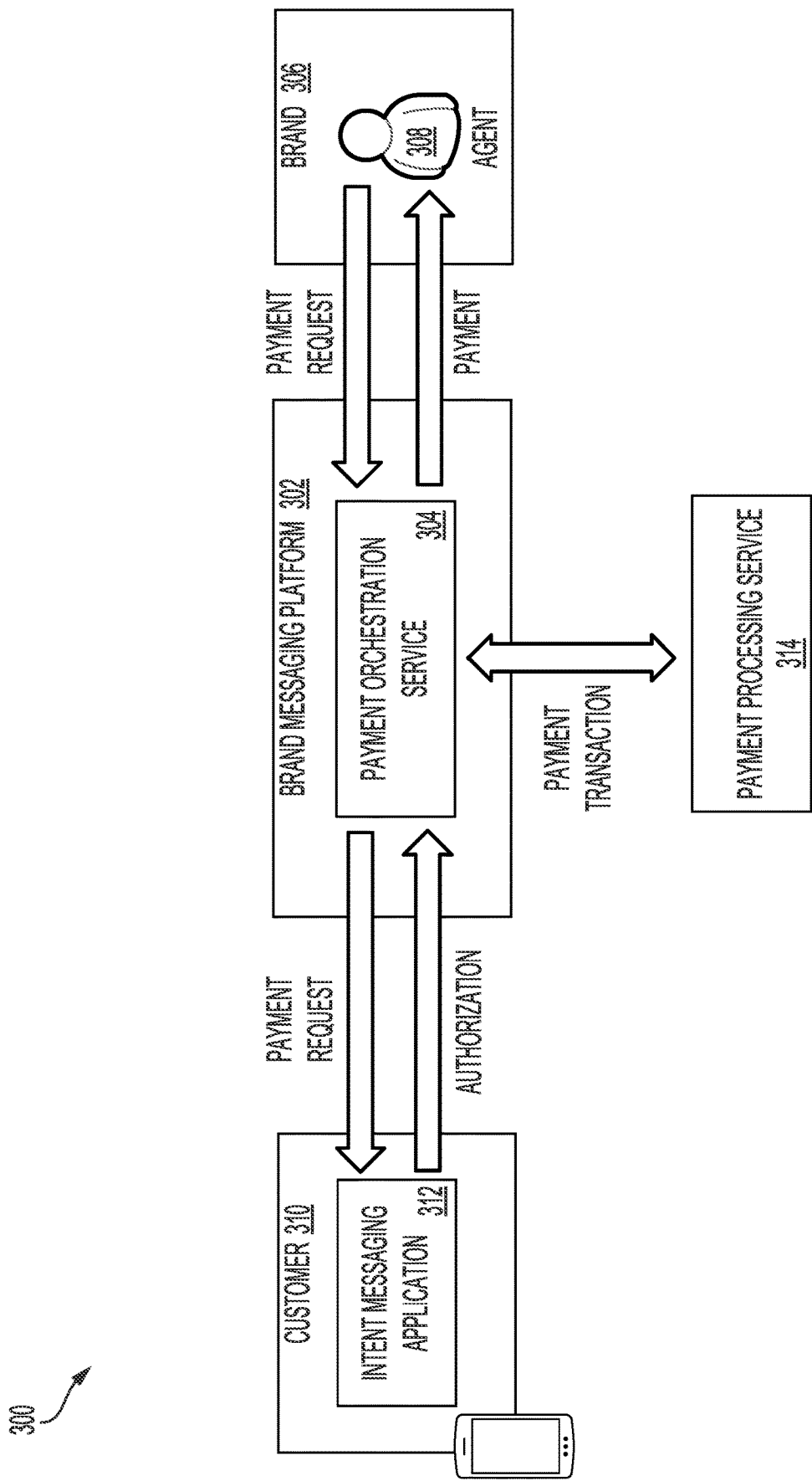
FIG. 3 shows an illustrative example of an environment in which a payment orchestration service of a brand messaging platform completes a payment transaction between a customer and a brand in accordance with at least one embodiment.

FIG. 3 shows an illustrative example of an environment 300 in which a payment orchestration service 304 of a brand messaging platform 302 completes a payment transaction between a customer 310 and a brand 306 in accordance with at least one embodiment. In the environment 300, an agent 308 associated with a particular brand 306 submits a request to a payment orchestration service 304 of the brand messaging platform 302 to obtain a payment from a customer 310 for goods and/or services provided by the brand 306 to the customer 310. For instance, during the course of a communications session (e.g., voice call, video call, etc.) between the customer 310 and the agent 308 associated with the brand 306, the agent 308 may determine that the customer 310 is to submit a payment to the brand 306 in order to fulfill a customer's request, address a customer's pending issue, or otherwise continue the communications session.

As noted above, the agent 308 associated with the brand 306 may be alerted, by the brand messaging platform 302, that the customer's computing device is capable of supporting submission of payments via rich messaging or via an intent messaging application 312 implemented on the customer's computing device. As a result, the agent 308 associated with the brand 306 may transmit a request to the payment orchestration service 304 of the brand messaging platform 302 to obtain a payment from the customer 310 via rich messaging or the intent messaging application 312 implemented on the customer's computing device. The request may specify the total payment amount, an invoice for the goods and/or services that are to be provided to the customer 310, an identifier of the customer 310 (e.g., identifier assigned to the customer 310 by the brand messaging platform 302, etc.) or other identifying information of the customer 310 (e.g., contact information of the customer 310, a network address of the customer 310, etc.).

In an embodiment, the request from the agent 308 also includes authentication information of the brand 306. This authentication information may be used by the payment orchestration service 304 to authenticate the agent 308 and determine whether the agent 308 is authorized to request and obtain payments from the customer 310 on behalf of the brand 306. For instance, an administrator or other entity that manages the brand 306 may identify one or more agents that may be associated with the brand and that are authorized to request and obtain payments on behalf of the brand 306. This administrator or other entity, via the brand messaging platform 302, may create an account for each of these authorized agents through which these authorized agents may access the brand messaging platform 302 and its corresponding services (e.g., payment orchestration service 304, etc.) to submit requests on behalf of the brand 306 subject to any policies or rules implemented by the brand 306, as defined in an agent account.

If the payment orchestration service 304 successfully authenticates the agent 308 associated with the brand 306 and determines, based on the policies and rules specified in the agent's account, that the agent 308 is authorized to submit requests on behalf of the brand 306 to solicit and obtain payments from customers, including customer 310, the payment orchestration service 304 may proceed with processing of the request from the agent 308. For instance, the payment orchestration service 304 may generate a virtual cart with a payment processing service 314 designated by the brand 306 for processing of payments from the customer 310. The virtual cart may specify the goods and/or services that are to be provided by the brand 306 to the customer 310. Further, the virtual cart may specify the payment amount being requested by the agent 308 for the goods and/or services indicated in the virtual cart. The payment orchestration service 304 may assign the virtual cart a unique identifier that is associated with the request submitted by the agent 308. The unique identifier may also be associated with an identifier of the brand 306 and an identifier of the customer 310. In an embodiment, the virtual cart also includes a timestamp corresponding to a time at which the request was submitted by the agent 308. This timestamp may be used to determine an expiration of the virtual cart if a payment authorization is not received from the customer 310 within an expiration period extending from the time indicated in the timestamp. For instance, if the expiration period elapses, the virtual cart becomes expired and the payment request to the customer is terminated. The payment orchestration service 304 may track the expiration period for the virtual cart to determine whether the virtual cart is expired prior to obtaining a payment authorization from the customer 310.

In an embodiment, the payment orchestration service 304 transmits a request to the intent messaging application 312 implemented on the customer's computing device to obtain a payment authorization that can be used to obtain a payment for the brand 306. The request may include the virtual cart generated by the payment orchestration service 304. For instance, the request may specify the unique identifier that is associated with the request submitted by the agent 308. Further, the request may specify the goods and/or services that the customer 310 is agreeing to provide payment for as part of the transaction between the customer 310 and the agent 308 associated with the brand 306. The request may also specify, for each of the goods and/or services to be provided by the brand 306, the associated cost to the customer 310. These costs, in addition to any other associated fees (e.g., sales taxes, value added taxes, etc.), may total the payment requested of the customer 310. In some instances, the request may indicate an expiration time before which the customer 310 is to provide its payment authorization in order to complete the transaction. The request may be transmitted to the customer's computing device as a rich message generated according to the RCS protocol. Alternatively, the request may be transmitted directly to the intent messaging application 312 implemented on the customer's computing device.

The request submitted by the payment orchestration service 304 to the intent messaging application 312 may be encrypted using a cryptographic key or other cryptographic method of the brand messaging platform 302. This may prevent the request from the payment orchestration service 304 from being tampered with en route to the intent messaging application 312 and provides an avenue for the intent messaging application 312 to authenticate the request from the payment orchestration service 304. For instance, if the request includes a digital signature of the payment orchestration service 304, the intent messaging application 312 may use a cryptographic key or a shared secret to verify that the digital signature is authentic and originated with the payment orchestration service 312.

If the obtained payment request from the payment orchestration service 304 is successfully authenticated by the intent messaging application 312, the intent messaging application 312 may present the payment request to the customer 310 and prompt the customer 310 for authorization to release a payment to the agent 308. For instance, the intent messaging application 312 may update a user interface of the customer's computing device to present the customer 310 with the request for payment. The intent messaging application 312 may also prompt the customer 310 to provide its payment authorization via one or more authorization methods approved by the payment orchestration service 304 and/or the payment processing service 314. For instance, the intent messaging application 312 may prompt the customer 310, via the user interface, to submit a PIN, password, one or more forms of biometric information (e.g., fingerprints, retinal scans, facial scans, audial recording, video recording, etc.), or any other identifying information of the customer 310 that may serve as an indication of authorization for the payment. The customer 310, via its computing device, may provide the requested authorization information to the intent messaging application 312. In addition to prompting the customer for its authorization information, the intent messaging application 312 may prompt the customer 310 to select a method of payment. For instance, via the intent messaging application 312, the customer 310 may provide its credit card information, banking information, digital wallet information, and the like.

The intent messaging application 312 may encrypt the customer's payment information and the customer's authorization information to generate an encrypted data packet that may be provided to the payment orchestration service 304 to fulfill the request from the payment orchestration service 304. The intent messaging application 312 may transmit, using a rich message via the RCS protocol or through any other available communications protocol, the encrypted data packet to the payment orchestration service 304. In response to obtaining the encrypted data packet from the intent messaging application 312, the payment orchestration service 304 may determine whether the customer 310 has provided its authorization for payment to be made to the agent 308 associated with the brand 306. For instance, in response to obtaining the encrypted data packet from the intent messaging application 312, the payment orchestration service 304 may use a cryptographic key or a shared secret to verify that the encrypted data packet is authentic and, if so, decrypt the encrypted data packet to obtain the customer's payment information and authorization information for the payment.

The payment orchestration service 304, in response to obtaining the customer's payment authorization information, may evaluate this information to determine whether it is valid. For instance, the brand messaging platform 302 may maintain a customer account of the customer 310 that includes valid authorization information for the customer 310. For example, as part of an account registration process with the brand messaging platform 302, the customer 310 may be required to provide a unique PIN or password for its account, to provide biometric information that can be associated with the account, or any other information that may be used to authorize payments on behalf of the customer 310 or other operations associated with the customer 310. The payment orchestration service 304 may evaluate the obtained authorization information from the intent messaging application 312 against the known valid authorization information stored in the customer's account to determine whether the authorization information provided by the customer 310 is valid.

If the payment orchestration service 304 determines that the authorization information is valid, the payment orchestration service 304 may transmit the payment information provided by the customer 310, as well as the unique identifier corresponding to the virtual cart previously provided to the payment processing service 314, to the payment processing service 314. The payment processing service 314 may initiate a transaction subject to the method selected by the customer 310 and the payment information submitted by the customer 310. For example, the payment processing service 314 may transmit a request to a payment provider to obtain the requisite payment. In some instances, the payment orchestration service 314 may provide payment authorization information of the customer 310 to the payment processing service 314, which may provide this payment authorization information to the payment provider. The payment provider may evaluate the authorization information to ensure that it is valid. If so, the payment provider may release the requisite payment to the payment processing service 314. If the payment is obtained by the payment processing service 314 from a payment provider, the payment processing service 314 may provide, to the payment orchestration service 304, a transaction code corresponding to this payment.

In response to receiving confirmation from the payment processing service 314 that the requested payment has been obtained, the payment orchestration service 304 may generate a digital receipt that specifies the goods and/or services that the customer 310 has submitted payment for, the payment amount, a transaction code corresponding to the payment transaction, and the like. The payment orchestration service 304 may transmit the digital receipt to the intent messaging application 312 to cause the intent messaging application 312 to present, via a user interface of the customer's computing device, the digital receipt. Alternatively, the intent messaging application 312 may indicate, to the customer 310 via the computing device, that the authorized payment has been submitted and that the transaction has been completed. In addition to providing a digital receipt to the intent messaging application 312, the payment orchestration service 304 may transmit a transaction code from the payment processing service 314 to the agent 308. The agent 308 can use the transaction code to verify that the customer 310 has provided its payment for the goods and/or services offered by the brand 306 and to retrieve the payment from the payment processing service 314. The agent 308 may confirm with the customer 310, over the communications session, that the payment has been received. Further, the agent 308 may provide the goods and/or services indicated in the transaction to the customer 310.

Figure 4:
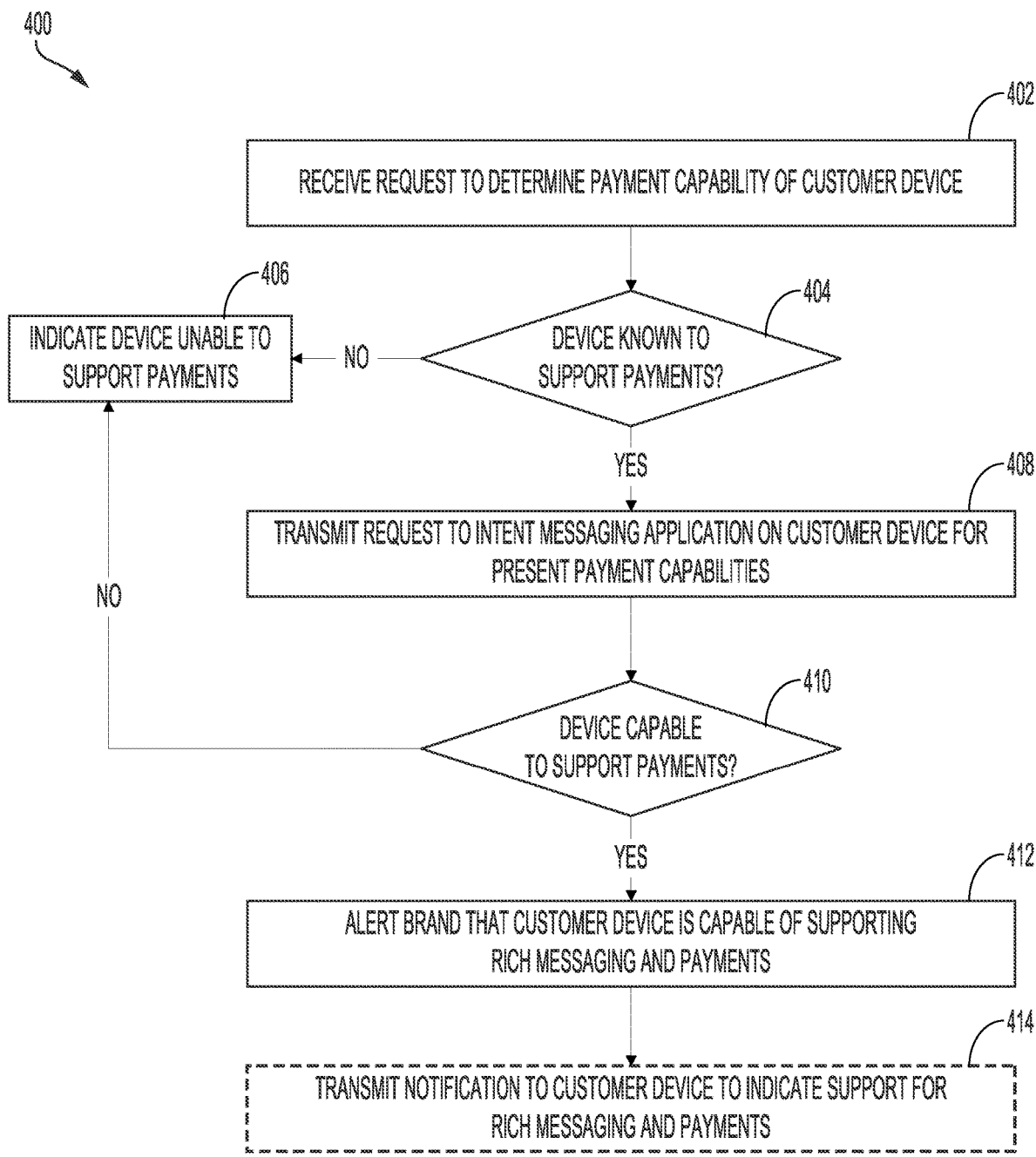
FIG. 4 shows an illustrative example of a process for determining rich messaging and payment capabilities of customer computing device to determine whether payment can be authorized and submitted from customer computing device in accordance with at least one embodiment.

FIG. 4 shows an illustrative example of a process 400 for determining rich messaging and payment capabilities of customer computing device to determine whether payment can be authorized and submitted from customer computing device in accordance with at least one embodiment. The process 400 may be performed by the brand messaging platform, which may utilize a device capability service and a presence service to process incoming requests to determine the capabilities of computing devices utilized by customers of the brand messaging platform. The computing devices utilized by customers to communicate with brands associated with the brand messaging platform, in some instances, may implement an intent messaging application provided by the brand messaging platform. The intent messaging application implemented on a customer's computing device may be provided by the intent messaging service to allow customers to interact with brands and other users that are associated with the intent messaging service (e.g., community of users that utilize the intent messaging service) and may provide goods and services to customers. The intent messaging application may also be implemented to facilitate payment transactions between customers and brands for any goods and/or services provided by these brands.

At step 402, the brand messaging platform, via a device capability service implemented by the brand messaging platform, receives a request from an agent associated with a brand to determine the payment capabilities of a computing device utilized by a particular customer. For instance, in the course of a communications session between a customer and an agent associated with a brand, the agent may determine that the customer is required to provide a payment to the brand. This communications session may include a voice call (e.g., telephone call, etc.), a video call, a text-based communication session (e.g., SMS messaging, RCS messaging, instant messaging, etc.), and the like. The customer may engage in a communications session with the agent associated with the brand to obtain goods and/or services provided by the brand. Alternatively, the customer may engage in a communications session with the agent associated with the brand to address a particular issue associated with goods and/or services provided by the brand.

During the communications session with the customer, the agent associated with the brand may submit a request to the device capability service of the brand messaging platform to determine whether the customer, via the customer's computing device (e.g., smartphone, tablet computing device, etc.), may provide payments via messages using an RCS protocol or other similar protocols and/or via an intent messaging application provided by the brand messaging platform. In some instances, the agent associated with the brand may solicit information from the customer that may be used by the brand messaging platform to identify the customer and query an account of the customer. For instance, the agent may ask the customer for its username or other customer identifier associated with the brand messaging platform. Alternatively, if the communications session between the customer and the agent associated with the brand is brokered via the intent messaging service implemented by the brand messaging platform, the device capability service may obtain the customer's identifier from the intent messaging service. In another example, the device capability service may utilize automatic number identification (ANI) to automatically determine the telephone number of the customer, which can be used by the agent to identify the customer.

In response to the request, the device capability service of the brand messaging platform, at step 404, determines whether the customer's computing device is known to support providing payment via rich messaging and/or via an intent messaging application installed on the computing device. For instance, the device capability service may utilize the customer identifier provided by the agent associated with the brand to retrieve the customer's account. The customer's account may specify information about the customer's computing device. For instance, as part of a registration process with the brand messaging platform, the customer may be prompted to provide specifications of the computing device utilized to access the brand messaging platform and any of the services provided by the brand messaging platform (e.g., intent messaging service, etc.). These specifications may include the storage capacity of the computing device, the amount of memory (e.g., random-access memory (RAM), etc.) of the computing device, the processor(s) implemented on the computing device, the mobile network operator utilized by the computing device, and the like. In an embodiment, if the customer implements an intent messaging application on the computing device, the intent messaging application can identify the capabilities of the computing device and transmit information corresponding to these capabilities to the brand messaging service. For instance, the intent message application may discover, via the operating system of the computing device, the various features of the computing device as well as the configuration of these features. Additionally, the intent message application may transmit configuration information to the device capability service corresponding to the features engaged in the intent message application. Thus, the device capability service may automatically determine the capabilities of the customer's computing device that implements the intent messaging application or other application provided by the brand messaging platform.

If the device capability service determines, based on an evaluation of the known device capabilities of the customer's computing device, that the customer's computing device is unable to support rich messaging for submission of payments, or is otherwise not known to support rich messaging, the device capability service, at step 406, indicates that the computing device is unable to support submission of payments. For instance, the device capability service may transmit a notification to the agent associated with the brand to indicate that payments cannot be obtained from the customer's computing device using rich messaging or through the intent messaging application. The agent associated with the brand may communicate with the customer to indicate that a payment is to be submitted over the communications session (e.g., customer is to provide its payment information over a voice call, etc.) or through other methods (e.g., customer is to access a website of the brand and submit payment via the website, etc.). The agent associated with the brand may alternatively terminate or otherwise conclude the communications session as a result of the notification from the device capability service.

If the device capability service determines that the customer's computing device is known to support rich messaging for submission of payment, or is otherwise known to support rich messaging, the brand messaging platform, at step 408, transmits a request to the intent messaging application implemented on the customer's computing device to identify the present payment capabilities. For instance, the brand messaging platform, via a presence service implemented by the brand messaging platform, may determine whether the intent messaging application implemented on the customer's computing device is available to provide responses to queries from the brand messaging platform. The presence service, for instance, may ping the intent messaging application to determine its availability. If the intent messaging application is available, the presence service may transmit a request to the intent messaging application to identify the present capabilities of the customer's computing device to support rich messaging for the submission of payments. The intent messaging application may evaluate the customer's computing device to determine the present capabilities of the customer's computing device and determine, based on these present capabilities, if the customer's computing device can support rich messaging. The intent messaging application may transmit a response to the request to the presence service indicating the present capabilities of the customer's computing device and/or a determination as to whether the customer's computing device supports rich messaging for the submission of payments.

At step 410, the presence service of the brand messaging platform determines whether the customer's computing device is currently capable of supporting payments via rich messaging. For instance, if the presence service is unable to determine whether the customer's computing device is currently capable of supporting payments via rich messaging (e.g., the presence service is unable to communicate with the intent messaging application, the intent messaging application has not provided a response, etc.), the presence service may determine that the customer's computing device is not presently capable of supporting payments via rich messaging. Similarly, if the intent messaging application transmits a notification to the presence service indicating that the customer's computing device does not support the submission of payments via rich messaging, the presence service may determine that the customer's computing device is not capable of supporting submission of payments. This may cause the presence service, at step 406, to indicate that the customer's computing device is unable to support the submission of payments via rich messaging. As described above, the device capability service may transmit a notification to the agent associated with the brand to indicate that payments cannot be obtained from the customer's computing device using rich messaging or through the intent messaging application.

If the presence service determines that the customer's computing device supports the submission of payments via rich messaging or through the intent messaging application, the presence service, at step 412, alerts the agent associated with the brand to indicate that the customer's computing device is capable of supporting submission of payments using rich messaging or via the intent messaging application. This alert may cause the agent associated with the brand to submit a request to a payment orchestration service of the brand messaging platform to obtain a payment from the customer for goods and/or services that are to be provided to the customer by the brand.

In addition to alerting the agent associated with the brand, the presence service, at step 414, may transmit a notification to the customer's computing device to indicate that the computing device may be used to submit payments via rich messaging or through the intent messaging application. This may allow the customer, via its computing device, to receive requests (such as through rich messages generated according to the RCS protocol) from a payment orchestration service to obtain the customer's authorization for submitting payments to brands for goods or services discussed between the customer and agents associated with these brands. The process for providing requests and other rich messages to the customer's computing device is described in greater detail below in connection with FIG. 5. It should be noted that step 414 may be optional, whereby the process 400 may be performed without execution of step 414.

Figure 5:
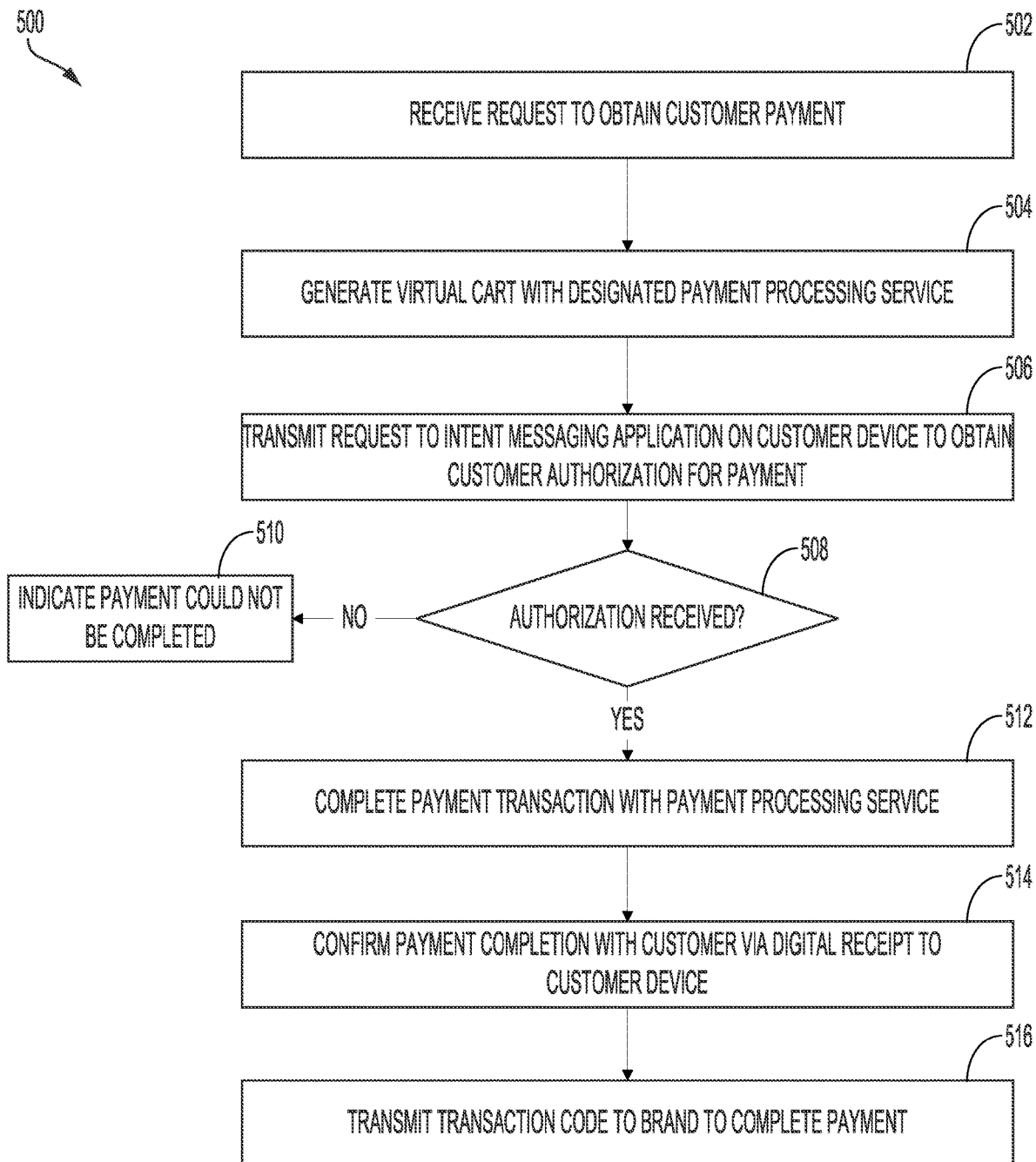
FIG. 5 shows an illustrative example of a process for performing a payment transaction between a customer and a brand in accordance with at least one embodiment.

FIG. 5 shows an illustrative example of a process 500 for performing a payment transaction between a customer and a brand in accordance with at least one embodiment. The process 500 may be performed by a payment orchestration service of the brand messaging platform. As noted above, the payment orchestration service may interact with a payment processing service designated by the brand for the processing and delivery of payments from customers and other entities to the brand. Further, the payment orchestration service may communicate with an intent messaging application implemented on a customer computing device to obtain payment information and authorization that may be provided to the payment processing service to process the payment required by the brand.

At step 502, the payment orchestration service of the brand messaging platform receives a request to obtain a customer payment for a particular transaction. The request may be submitted by an agent associated with a brand. For instance, if an agent associated with a brand determines that a payment is required from the customer to complete a transaction between the brand and the customer (e.g., a payment is required to complete a purchase order, a payment is required for the agent to perform a service on behalf of the customer, etc.). As noted above, the agent associated with the brand may have previously obtained a notification from a presence service of the brand messaging platform indicating the capabilities of the customer's computing device for generating and processing rich messages and for providing payments using rich messaging. For instance, the presence service may determine whether the customer's computing device is capable of utilizing the RCS protocol to transmit rich messages that may be used to deliver payment information and any other information that may serve as a payment authorization to provide a payment to the brand. The agent associated with the brand may, thus, determine that the customer may submit an authorization to release a payment to the brand via rich messaging from its computing device, whereby the payment may be provided to the brand securely (e.g., via cryptographically secure messages, etc).

The request to obtain the customer payment may include authentication information of the brand, which the payment orchestration service of the brand messaging platform may use to authenticate the agent and determine whether the agent is authorized, on behalf of the brand, to request and obtain payments from the customer. For instance, the brand may develop a trust relationship with the brand messaging platform, whereby the brand may be vetted by the brand messaging platform as providing valid resources and services to customers that may interact with the brand via the brand messaging platform. Through this trust relationship, the brand may identify one or more agents that may be associated with the brand and that may be authorized to request and obtain payments from customers on behalf of the brand. For instance, the brand may generate, for each one or more authorized agents, an account with the brand messaging platform through which an agent may access the brand messaging platform and submit requests on behalf of the brand subject to any policies or rules implemented by the brand via the brand messaging platform and defined in the agent account. If the agent is authenticated by the brand messaging platform and the brand messaging platform determines that the agent is authorized to submit the request to obtain the customer payment, the brand messaging platform may proceed with processing of this request. However, if the brand messaging platform is unable to authenticate the agent, or the agent is not authorized to submit this request, the payment orchestration service of the brand messaging platform may reject the request.

At step 504, the payment orchestration service generates a virtual cart with the payment processing service designated by the brand for processing of the customer's payment. The virtual cart may specify the goods and/or services that are to be provided by the brand to the customer to which payment is to be solicited. Further, the virtual cart may specify the payment amount being requested by the agent associated with the brand for the goods and/or services indicated in the virtual cart. The virtual cart may further specify an account number, invoice number, or any other information that may be used to identify the transaction and the entities to be credited with a payment. In an embodiment, the virtual cart is assigned with a unique identifier that is associated with the request submitted by the agent to obtain a payment from the customer. The unique identifier may also be associated with an identifier of the brand and an identifier of the customer. In an embodiment, the virtual cart also includes a timestamp corresponding to a time at which the request was submitted by the agent associated with the brand. This timestamp may be used to determine an expiration of the virtual cart if a payment authorization is not received by the customer within a period of time extending from the time indicated in the timestamp. For instance, the payment orchestration service may implement an expiration period for each virtual cart whereby, if the expiration period elapses, the virtual cart becomes expired and the payment request to the customer is terminated. The payment orchestration service may track the expiration period for the virtual cart to determine whether the virtual cart is expired prior to obtaining a payment authorization from the customer.

At step 506, the payment orchestration service transmits a request to the intent messaging application implemented on the customer's computing device to obtain the customer's authorization for submitting a payment to the brand for the goods or services discussed between the customer and the agent associated with the brand. The request may include a customer version of the virtual cart provided by the payment orchestration service to the payment processing service. For instance, the request may specify the unique identifier that is associated with the request submitted by the agent associated with the brand to the payment orchestration service. Further, the request may specify the goods and/or services that the customer is agreeing to provide payment for as part of the transaction between the customer and the agent associated with the brand. The request may also specify, for each of the goods and/or services to be provided by the brand, the associated cost to the customer. These costs, in addition to any other associated fees (e.g., sales taxes, value added taxes, etc.), may total the payment requested of the customer. In some instances, the request may indicate an expiration time before which the customer is to provide its payment authorization in order to complete the transaction. For example, the request may include instructions that, as a result of being executed by the intent messaging application implemented on the customer's computing device, cause the intent messaging application to continuously update the customer as to the remaining amount of time before the request is set to expire. The request may be transmitted to the customer's computing device as a rich message generated according to the RCS protocol.

In an embodiment, the request transmitted to the intent messaging application implemented on the customer's computing device is encrypted using a cryptographic key or other cryptographic method of the brand messaging platform. In response to obtaining the encrypted request from the payment orchestration service, the intent messaging application may attempt to authenticate the request as having originated from the payment orchestration service. For instance, if the request includes a digital signature of the payment orchestration service, the intent messaging application may use a cryptographic key or a shared secret to verify that the digital signature is authentic and originated with the payment orchestration service. If the request from the payment orchestration service cannot be verified by the intent messaging application, the intent messaging application may transmit a notification to the payment orchestration service to indicate that the request for payment could not be authenticated. This may cause the payment orchestration service to perform one or more remedial operations, such as sending a new payment request to the intent messaging application, identifying the source of the authentication failure (e.g., the request did not originate from the payment orchestration service, etc.), or any other operation for addressing the authentication failure.

If the obtained payment request from the payment orchestration service is successfully authenticated, the intent messaging application may present the payment request to the customer and prompt the customer for authorization to release a payment to the agent associated with the brand. For instance, the intent messaging application may update a user interface of the computing device to present the customer with the request for payment from the agent associated with the brand. Further, the intent messaging application may prompt the customer to provide its payment authorization via one or more authorization methods approved by the payment orchestration service. For instance, the intent messaging application may prompt the customer, via the user interface of the customer's computing device, to submit a PIN, password, one or more forms of biometric information (e.g., fingerprints, retinal scans, facial scans, audial recording, video recording, etc.), and the like. Using one or more peripheral devices of the customer's computing device (e.g., touchscreen, camera, microphone, etc.), the customer may provide the requested authorization information to the intent messaging application. In addition to prompting the customer for its authorization information, the intent messaging application may prompt the customer to select a method of payment. For instance, via the intent messaging application, the customer may provide its credit card information, banking information, digital wallet information, and the like.

In an embodiment, in response to obtaining the customer's payment information and authorization information, the intent messaging application encrypts the customer's payment information and authorization information to generate an encrypted data packet. The intent messaging application may transmit, using a rich message via the RCS protocol or through any other available communications protocol, the encrypted data packet to the payment orchestration service. Thus, at step 508, the payment orchestration service may determine whether a customer's authorization for payment to the agent associated with the brand has been received. For instance, in response to obtaining the encrypted data packet from the intent messaging application implemented on the customer's computing device, the payment orchestration service may use a cryptographic key or a shared secret to verify that the encrypted data packet is authentic and, if so, decrypt the encrypted data packet to obtain the customer's payment information and authorization information for the payment.

In an embodiment, the payment orchestration service evaluates the authorization information for the payment to determine whether the authorization information is valid. For instance, the brand messaging platform may maintain a customer account of the customer that includes valid authorization information for the customer. When a customer creates an account with the brand messaging platform, the customer may be prompted to provide authorization information or any other information that may be used to authenticate the customer. For example, as part of an account registration process, the customer may be prompted to generate a unique PIN or password for its account, to provide biometric information that can be associated with the account, or any other information that may be used to authorize payments on behalf of the customer or other operations associated with the customer. Thus, the payment orchestration service may evaluate the obtained authorization information from the intent messaging application against the known valid authorization information stored in the customer's account to determine whether the authorization information provided by the customer is valid.

If the payment orchestration service determines that the customer's authorization has not been received (e.g., the encrypted data packet is invalid, the provided authorization information is invalid, the payment request has expired, etc.), the payment orchestration service, at step 510, may indicate that payment for the goods or services could not be completed. For instance, the payment orchestration service may transmit a notification to the agent associated with the brand that submitted the payment request to indicate that payment request could not be fulfilled. The notification may specify the cause for the failure to fulfill the payment request. This information may be used by the agent associated with the brand to communicate with the customer the failure in providing payment for the goods and/or services that the customer has requested or are otherwise being offered by the agent during the communications session (e.g., voice call, video call, etc.) with the customer. The agent associated with the brand, in response to this notification, may submit a new payment request to the payment orchestration process, thereby restarting the process 500. Alternatively, the agent associated with the brand may terminate the communications session with the customer as a result of failure to provide payment for the proffered goods and/or services.

If the payment orchestration service has received the customer's authorization information and determines that the authorization information is valid, the payment orchestration service, at step 512, completes the payment transaction with the payment processing service. For instance, the payment orchestration service may transmit the payment information provided by the customer, as well as the unique identifier corresponding to the virtual cart previously provided to the payment processing service, to the payment processing service. Using this payment information, the payment processing service may initiate a transaction subject to the method selected by the customer and the payment information submitted by the customer. For example, the payment processing service may transmit a request to a payment provider (e.g., credit card company, financial institution, etc.) to obtain the requisite payment. In some instances, the payment orchestration service may provide payment authorization information of the customer to the payment processing service, which may provide this payment authorization information to the payment provider. The payment provider may evaluate the authorization information to ensure that it is valid. If so, the payment provider may release the requisite payment to the payment processing service. In an embodiment, if the payment is obtained by the payment processing service, the payment processing service provides, to the payment orchestration service, a transaction code corresponding to this payment.

At step 514, the payment orchestration service confirms payment completion with the customer via a digital receipt to the customer's computing device. For instance, in response to receiving confirmation from the payment processing service that the requested payment has been obtained for the goods and/or services indicated in the virtual cart, the payment orchestration service may generate a receipt that specifies the goods and/or services that the customer has submitted payment for, the payment amount, a transaction code corresponding to the payment transaction, and the like. The payment orchestration service may transmit the digital receipt to the intent messaging application implemented on the customer's computing device. This may cause the intent messaging application to present, via a user interface of the customer's computing device, the digital receipt. Alternatively, the intent messaging application may indicate, to the customer via the computing device, that the authorized payment has been submitted and that the transaction has been completed. Through the intent messaging application, the customer may access the digital receipt, such as referring to a unique transaction number or order number associated with the transaction.

At step 516, the payment orchestration service transmits the transaction code from the payment processing service to the agent associated with the brand to complete the payment for the goods and/or services proffered by the agent to the customer. The agent may utilize the transaction code to verify that the customer has provided its payment for the proffered goods and/or services and to retrieve the payment from the payment processing service. The agent may confirm with the customer, over the communications session between the agent and the customer, that the payment has been received. Further, the agent associated with the brand may provide the goods and/or services indicated in the transaction to the customer. For instance, the agent may initiate a process to ship certain goods ordered over the communications session to the customer at a designated address or location. Alternatively, the agent may update the brand to provide its services to the customer. For instance, the customer may be provided with credentials to access one or more services provided by the brand.

Figure 6:
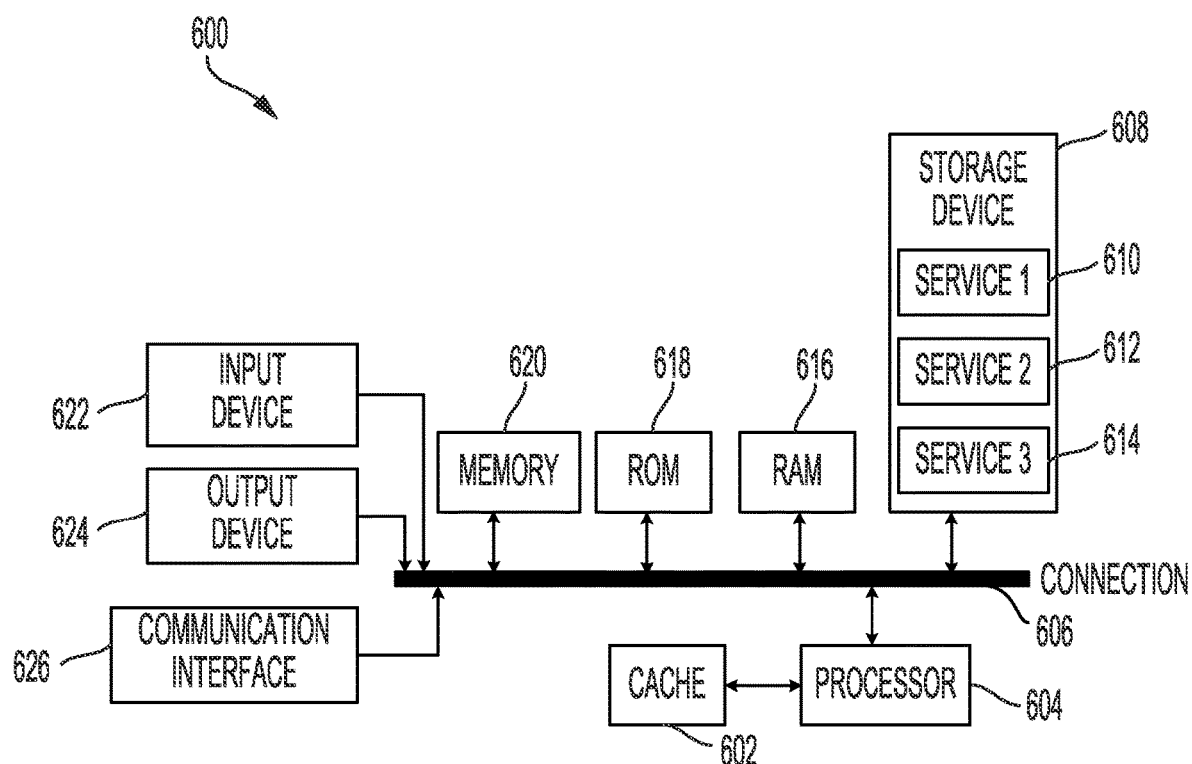
FIG. 6 shows an illustrative example of an environment in which various embodiments can be implemented.

FIG. 6 illustrates a computing system architecture 600 including various components in electrical communication with each other using a connection 606, such as a bus, in accordance with some implementations. Example system architecture 600 includes a processing unit (CPU or processor) 604 and a system connection 606 that couples various system components including the system memory 620, such as ROM 618 and RAM 616, to the processor 604. The system architecture 600 can include a cache 602 of high-speed memory connected directly with, in close proximity to, or integrated as part of the processor 604. The system architecture 600 can copy data from the memory 620 and/or the storage device 608 to the cache 602 for quick access by the processor 604. In this way, the cache can provide a performance boost that avoids processor 604 delays while waiting for data. These and other modules can control or be configured to control the processor 604 to perform various actions.

Other system memory 620 may be available for use as well. The memory 620 can include multiple different types of memory with different performance characteristics. The processor 604 can include any general purpose processor and a hardware or software service, such as service 1 610, service 2 612, and service 3 614 stored in storage device 608, configured to control the processor 604 as well as a special-purpose processor where software instructions are incorporated into the actual processor design. The processor 604 may be a completely self-contained computing system, containing multiple cores or processors, a bus, memory controller, cache, etc. A multi-core processor may be symmetric or asymmetric.

To enable user interaction with the computing system architecture 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing system architecture 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 is a non-volatile memory and can be a hard disk or other types of computer readable media which can store data that are accessible by a computer, such as magnetic cassettes, flash memory cards, solid state memory devices, digital versatile disks, cartridges, RAMs 616, ROM 618, and hybrids thereof.

The storage device 608 can include services 610, 612, 614 for controlling the processor 604. Other hardware or software modules are contemplated. The storage device 608 can be connected to the system connection 606. In one aspect, a hardware module that performs a particular function can include the software component stored in a computer-readable medium in connection with the necessary hardware components, such as the processor 604, connection 606, output device 624, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
receiving a capability request to determine a set of payment capabilities for submission of payments through an intent messaging application implemented on a computing device, wherein the capability request is received during an ongoing communications session between a customer and an integrated voice response (IVR) system;
processing configuration information associated with the computing device to determine a set of capabilities of the computing device to submit payments through a Rich Communication Services (RCS) protocol;
transmitting an availability request to determine an availability of the intent messaging application to provide the payments according to the RCS protocol, wherein when the availability request is received at the intent messaging application, the intent messaging application identifies a present set of payment capabilities associated with the computing device;
determining, based on the present set of payment capabilities, that the computing device is capable of submitting payments through the RCS protocol and during the ongoing communications session;
providing a response to the capability request, wherein the response includes an indication that the computing device supports submitting the payments through the RCS protocol;
receiving a payment request to obtain a payment through the intent messaging application according to the RCS protocol, wherein the payment request is received during the ongoing communications session;
transmitting a payment authorization request during the ongoing communications session, wherein when the payment authorization request is received by the intent messaging application, the intent messaging application generates a prompt for authorization data;
receiving a data packet including the authorization data, wherein the data packet is received through the RCS protocol and during the ongoing communications session; and
initiating a transaction subject to the authorization data, wherein the transaction is used to provide the payment during the ongoing communications session and through the RCS protocol.

2. The computer-implemented method of claim 1, further comprising:
providing payment information corresponding to the payment, wherein when the payment information is received at a payment processing system, the payment processing system provides the payment during the ongoing communications session.

3. The computer-implemented method of claim 1, further comprising:
generating a virtual cart, wherein the virtual cart indicates a payment amount associated with the payment; and
presenting the virtual cart through the intent messaging application.

4. The computer-implemented method of claim 1, wherein the capability request includes identifying information associated with the customer, and wherein the identifying information is used to identify the configuration information associated with the computing device.

5. The computer-implemented method of claim 1, wherein the response includes a set of recommendations presentable to the customer, and wherein the set of recommendations is generated through a trained machine learning algorithm based on the capability request and identifying information associated with the customer.

6. The computer-implemented method of claim 1, wherein the ongoing communications session is brokered through the intent messaging application.

7. The computer-implemented method of claim 1, wherein:
the data packet is encrypted using a cryptographic key associated with the computing device; and
the computer-implemented method further comprises decrypting the data packet to obtain the authorization data.

8. A system, comprising:
one or more processors; and
memory storing thereon instructions that, as a result of being executed by the one or more processors, cause the system to:
receive a capability request to determine a set of payment capabilities for submission of payments through an intent messaging application implemented on a computing device, wherein the capability request is received during an ongoing communications session between a customer and an integrated voice response (IVR) system;
process configuration information associated with the computing device to determine a set of capabilities of the computing device to submit payments through a Rich Communication Services (RCS) protocol;
transmit an availability request to determine an availability of the intent messaging application to provide the payments according to the RCS protocol, wherein when the availability request is received at the intent messaging application, the intent messaging application identifies a present set of payment capabilities associated with the computing device;
determine, based on the present set of payment capabilities, that the computing device is capable of submitting payments through the RCS protocol and during the ongoing communications session;
provide a response to the capability request, wherein the response includes an indication that the computing device supports submitting the payments through the RCS protocol;
receive a payment request to obtain a payment through the intent messaging application according to the RCS protocol, wherein the payment request is received during the ongoing communications session;
transmit a payment authorization request during the ongoing communications session, wherein when the payment authorization request is received by the intent messaging application, the intent messaging application generates a prompt for authorization data;
receive a data packet including the authorization data, wherein the data packet is received through the RCS protocol and during the ongoing communications session; and
initiate a transaction subject to the authorization data, wherein the transaction is used to provide the payment during the ongoing communications session and through the RCS protocol.

9. The system of claim 8, wherein the instructions further cause the system to:

provide payment information corresponding to the payment, wherein when the payment information is received at a payment processing system, the payment processing system provides the payment during the ongoing communications session.

10. The system of claim 8, wherein the instructions further cause the system to:
generate a virtual cart, wherein the virtual cart indicates a payment amount associated with the payment; and
present the virtual cart through the intent messaging application.

11. The system of claim 8, wherein the capability request includes identifying information associated with the customer, and wherein the identifying information is used to identify the configuration information associated with the computing device.

12. The system of claim 8, wherein the response includes a set of recommendations presentable to the customer, and wherein the set of recommendations is generated through a trained machine learning algorithm based on the capability request and identifying information associated with the customer.

13. The system of claim 8, wherein the ongoing communications session is brokered through the intent messaging application.

14. The system of claim 8, wherein:
the data packet is encrypted using a cryptographic key associated with the computing device; and
the instructions further cause the system to decrypt the data packet to obtain the authorization data.

15. A non-transitory computer-readable storage medium storing thereon executable instructions that, as a result of being executed by one or more processors of a computer system, cause the computer system to:
receive a capability request to determine a set of payment capabilities for submission of payments through an intent messaging application implemented on a computing device, wherein the capability request is received during an ongoing communications session between a customer and an integrated voice response (IVR) system;
process configuration information associated with the computing device to determine a set of capabilities of the computing device to submit payments through a Rich Communication Services (RCS) protocol;
transmit an availability request to determine an availability of the intent messaging application to provide the payments according to the RCS protocol, wherein when the availability request is received at the intent messaging application, the intent messaging application identifies a present set of payment capabilities associated with the computing device;
determine, based on the present set of payment capabilities, that the computing device is capable of submitting payments through the RCS protocol and during the ongoing communications session;
provide a response to the capability request, wherein the response includes an indication that the computing device supports submitting the payments through the RCS protocol;
receive a payment request to obtain a payment through the intent messaging application according to the RCS protocol, wherein the payment request is received during the ongoing communications session;
transmit a payment authorization request during the ongoing communications session, wherein when the payment authorization request is received by the intent messaging application, the intent messaging application generates a prompt for authorization data;
receive a data packet including the authorization data, wherein the data packet is received through the RCS protocol and during the ongoing communications session; and
initiate a transaction subject to the authorization data, wherein the transaction is used to provide the payment during the ongoing communications session and through the RCS protocol.

16. The non-transitory computer-readable storage medium of claim 15, wherein the executable instructions further cause the computer system to:
provide payment information corresponding to the payment, wherein when the payment information is received at a payment processing system, the payment processing system provides the payment during the ongoing communications session.

17. The non-transitory computer-readable storage medium of claim 15, wherein the executable instructions further cause the computer system to:
generate a virtual cart, wherein the virtual cart indicates a payment amount associated with the payment; and
present the virtual cart through the intent messaging application.

18. The non-transitory computer-readable storage medium of claim 15, wherein the capability request includes identifying information associated with the customer, and wherein the identifying information is used to identify the configuration information associated with the computing device.

19. The non-transitory computer-readable storage medium of claim 15, wherein the response includes a set of recommendations presentable to the customer, and wherein the set of recommendations is generated through a trained machine learning algorithm based on the capability request and identifying information associated with the customer.

20. The non-transitory computer-readable storage medium of claim 15, wherein the ongoing communications session is brokered through the intent messaging application.

21. The non-transitory computer-readable storage medium of claim 15, wherein:
the data packet is encrypted using a cryptographic key associated with the computing device; and
the executable instructions further cause the computer system to decrypt the data packet to obtain the authorization data.

* * * * *